United States Patent
Monti

(10) Patent No.: US 11,091,322 B2
(45) Date of Patent: Aug. 17, 2021

(54) TRANSPORT SYSTEM

(71) Applicant: MARCHESINI GROUP S.p.A., Pianoro (IT)

(72) Inventor: Giuseppe Monti, Pianoro (IT)

(73) Assignee: MARCHESINI GROUP S.P.A., Pianoro (IT)

( * ) Notice: Subject to any disclaimer, the term of this patent is extended or adjusted under 35 U.S.C. 154(b) by 0 days.

(21) Appl. No.: 16/979,732

(22) PCT Filed: Mar. 14, 2019

(86) PCT No.: PCT/IB2019/052096
§ 371 (c)(1),
(2) Date: Sep. 10, 2020

(87) PCT Pub. No.: WO2019/180557
PCT Pub. Date: Sep. 26, 2019

(65) Prior Publication Data
US 2021/0039892 A1   Feb. 11, 2021

(30) Foreign Application Priority Data
Mar. 19, 2019   (IT) .................. 102018000003714

(51) Int. Cl.
*B65G 35/06* (2006.01)
*B65G 39/02* (2006.01)
*B65G 39/12* (2006.01)

(52) U.S. Cl.
CPC ............ *B65G 35/06* (2013.01); *B65G 39/02* (2013.01); *B65G 39/12* (2013.01); *B65G 2207/30* (2013.01)

(58) Field of Classification Search
None
See application file for complete search history.

(56) References Cited

U.S. PATENT DOCUMENTS

| | | | |
|---|---|---|---|
| 9,604,795 B2 * | 3/2017 | Aumann | B65G 54/02 |
| 10,351,350 B2 * | 7/2019 | Nara | B65G 35/06 |
| 10,587,212 B1 * | 3/2020 | Van Dorpe | B60L 13/03 |
| 10,858,192 B2 * | 12/2020 | Neufeld | H02K 7/08 |

FOREIGN PATENT DOCUMENTS

| | | |
|---|---|---|
| EP | 2544974 A1 | 1/2013 |
| JP | 3556366 B2 | 8/2004 |
| WO | WO2011110925 | 9/2011 |

* cited by examiner

*Primary Examiner* — Kavel Singh
(74) *Attorney, Agent, or Firm* — R. Neil Sudol; Henry D. Coleman

(57) ABSTRACT

A transport system (S) comprises a guide path (1) and at least one mobile carriage (2) movable along the guide path (1). The guide path (1) comprises a first guide profile (11) and a second guide profile (12). A single pair of rollers (31, 32) are mounted rotatably in an independent way to one another on a first rotation shaft (51) borne by the mobile carriage (2) so as to be in contact with the first guide profile (11). A first pair of rollers (41, 42) and a second pair of rollers (43, 44) are mounted rotatably in an independent way to one another on a second rotation shaft (52) and on a third rotation shaft (53) borne by the mobile carriage (2) so as to be in contact with the second guide profile (12).

8 Claims, 5 Drawing Sheets

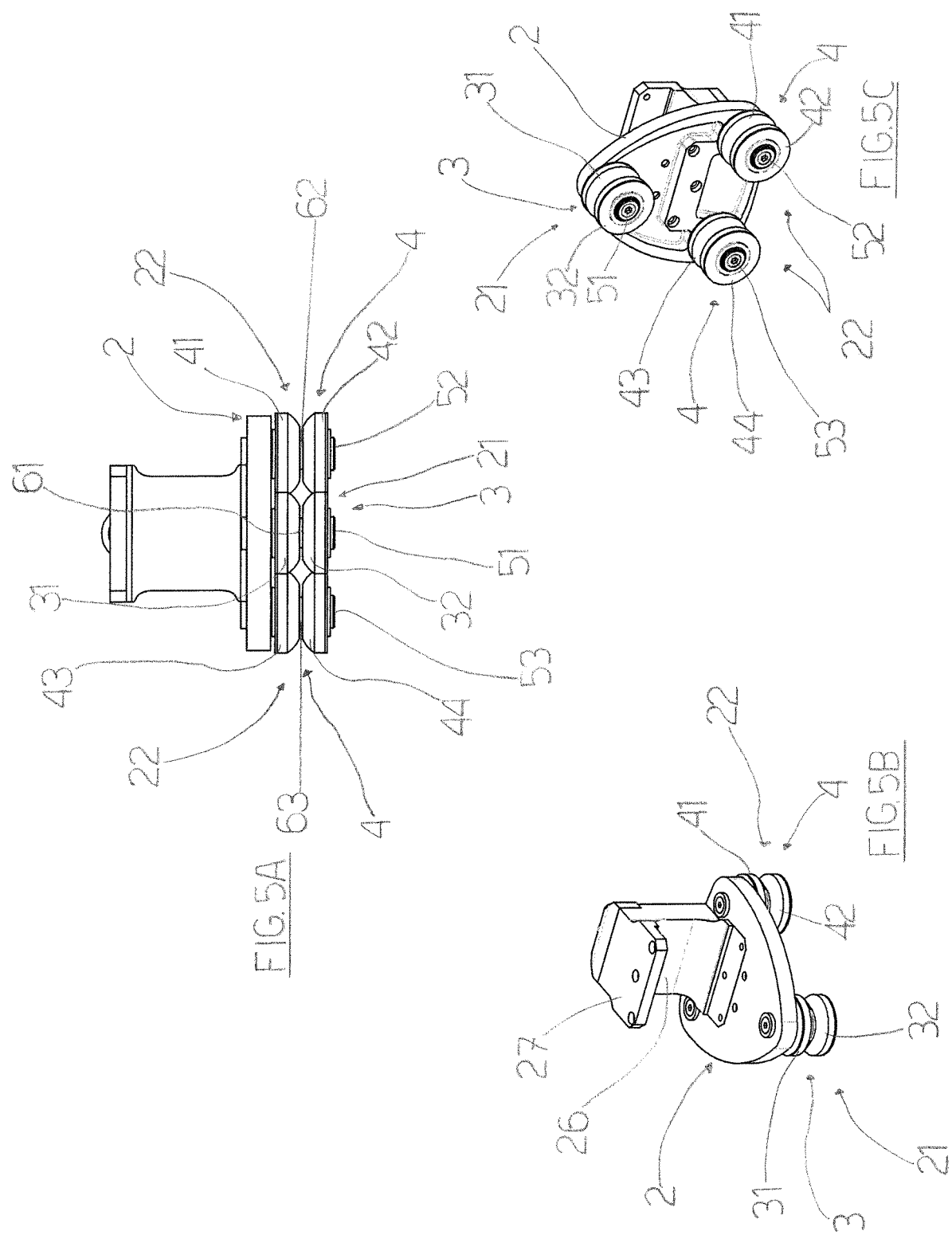

TRANSPORT SYSTEM

FIELD OF THE INVENTION

The present invention relates to a transport system (S) for transport of products.

DESCRIPTION OF THE PRIOR ART

In the sector of automatic machines there is a known need to be able to transport products, objects, articles, components etc. along a predefined path so as to have an exact and precise understanding of the position and orientation thereof, in specific phase relations which are to be carried out.

A type of transport system at present used for transport of products comprises at least a mobile carriage, for transport of at least a relative product, and a guide path along which the mobile carriage is moved by relative actuator means, such as for example linear motors or transport belts.

Some of these transport systems are realised in such a way that the guide path, along which the mobile carriage is to be moved, is structured and configured in such a way as to have a first guide profile and a second guide profile which extend parallel to one another and which have straight portions and curved portions.

The guide path is usually structured and configured so that the first guide profile and the second guide profile identify a closed looped guide path for movement of the carriage, therefore comprising a succession of straight portions connected by curved portions.

The first guide profile is conformed in such a way as in turn to have a first rolling wall and a second rolling wall, arranged inclined to one another, and likewise the second guide profile is conformed in such a way as in turn to have a first rolling wall and a second rolling wall, arranged inclined with respect to one another.

In order to be guided and moved along the guide path, and therefore along the first guide profile and the second guide profile, the mobile carriage comprises rolling members which must be predisposed in such a way as to be in contact with and roll on the two rolling walls of each of the two guide profiles.

At present, in these transport systems with this type of guide path, the mobile carriages are conceived and structured so as to comprise a first group of rolling members which are predisposed so as to be coupled to the first guide profile and a second group of rolling members which are predisposed to be coupled to the second guide profile.

In particular, in the mobile carriages used up to now, the first group of rolling members, coupled to the first guide profile and a second group of rolling members, coupled to the second guide profile, each comprises two or more wheels.

Each of these wheels is conformed in such a way as to comprise a first contact surface and a second contact surface and is predisposed on the carriage in such a way that the first contact surface is in contact with the first rolling wall of the (first or second) guide profile and the second contact surface is in contact with the second rolling wall of the (first or second) guide profile.

Each wheel is also predisposed and mounted on the carriage so as to be able to rotate about a relative rotation axis so that the two contact surfaces can rotate along the rolling walls of the guide profile when the carriage is moved by actuator means: in this way the carriage can be moved along the guide path with the wheels that roll along and in contact with the two rolling walls of the guide profiles.

These transport systems however have some drawbacks.

Firstly, the carriages must transport products having weight and therefore the wheels are subjected to stresses that might cause a different distribution of the friction forces which act on the first contact surface and on the second contact surface.

In fact, according to the distribution of the weight of the product to be transported, it can occur that the first contact surface of the wheels is pushed with greater force against the first rolling wall of the profile and thus with respect to the second contact surface against the second rolling wall (or the inverse situation can occur).

As the two contact surfaces of the wheel rotate at the same velocity, the first contact surface will be subjected to a greater friction and thus to greater wear. Further, the guide profiles of the guide path can have imperfections and therefore the distance between the two rolling surfaces (or the reciprocal inclination) can undergo variations, though slight.

As the distance between the two contact surfaces of the wheels is always constant, in this case too there might arise different stresses acting on the two contact surfaces of a same wheel, and therefore also different friction forces, with consequent different wear.

These drawbacks, in the long run, have an effect on the stability of the carriage and bring about the necessity of having frequently to have recourse to the replacement of the wheels.

Lastly, a further drawback of this type of transport system is exhibited at the moment in which the mobile carriage passes from a straight portion to a curved portion of the guide path.

In fact, according to the degree of curvature of the curved portion, it can happen that when the mobile carriage is moved so as to transit from a straight portion to a curved portion and follow that curved portion, not all the wheels of the first group of rolling members and/or not all the wheels of the second group of rolling members remain contemporaneously in contact with the first guide profile and with the second guide profile.

In this circumstance too, if one or more wheels lose contact with the relative guide profile, there will occur stresses that are such as to generate significant friction forces for those wheels that remain in contact with the guide profiles and, therefore, consequently a high degree of wear.

Further, the loss of contact of one or more wheels can have an effect on the mobile carriage, and therefore also on the stability and orientation of the product transported, during the movement of the carriage along the curved portions of the guide path.

SUMMARY OF THE INVENTION

The aim of the present invention is therefore to describe a new transport system for transport of products that is able to obviate the above-cited drawbacks present in the transport systems of known type.

In particular, an aim of the present invention is to provide a new transport system that is such as to enable significantly reducing the degree of wear on the rolling members and further to guarantee the stability of the mobile carriage even when it is moved to follow curved portions.

The above aims are attained with a transport system according to the contents of claim 1.

Other advantageous characteristics of the transport system of the invention are set down in the various dependent claims.

BRIEF DESCRIPTION OF THE DRAWINGS

The characteristics of a preferred but not exclusive embodiment of the transport system of the present invention are described in detail in the following with reference to the appended tables of drawings, in which:

FIG. 5A illustrates, in a view from above, the mobile carriage and the rolling members of the transport system proposed by the present invention;

FIGS. 5B and 5C illustrate the mobile carriage of FIG. 5A according to perspective views from various angles.

DESCRIPTION OF THE PREFERRED EMBODIMENTS

With reference to the appended tables of drawings, reference (S) denotes the transport system for the transport of products of the present invention in its entirety.

The transport system (S) comprises a guide path (1) and at least a mobile carriage (2) for transport of products movable along the guide path (1).

For example, in preferred ways (neither illustrated nor described in detail as of known type and not being a part of the invention) the mobile carriage (2) can be movable along the guide path (1) by use of activating belts or other actuators such as linear motors or the like.

Figure 1:
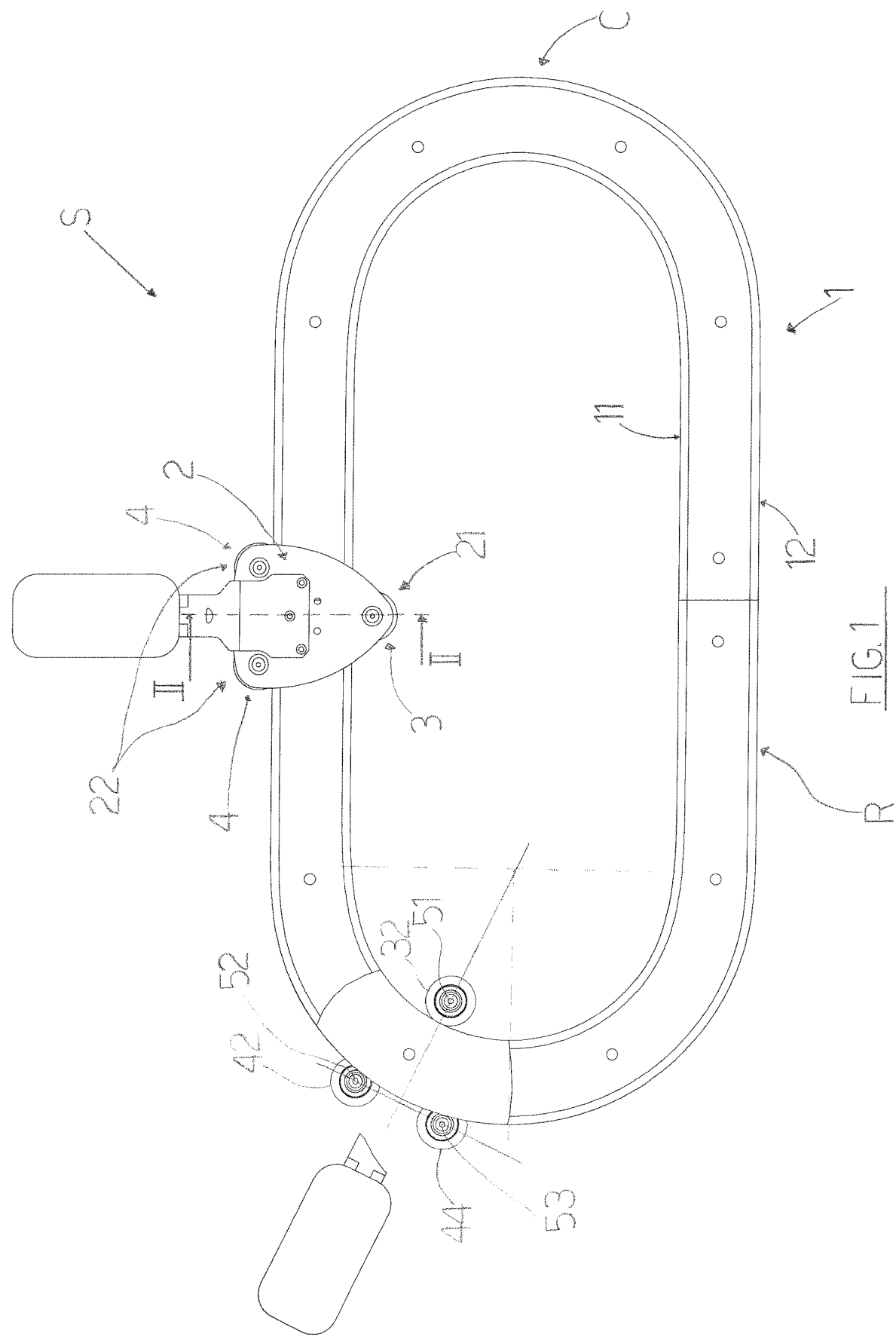
FIG. 1 is a schematic plan view of the transport system of the present invention in its entirety, with a part partially sectioned in order to illustrate some significant components thereof.

The guide path (1) is conformed in such a way as to comprise a first guide profile (11) and a second guide profile (12), arranged parallel to one another and having an extension that is such as to comprise at least a straight portion (R) and at least a curved portion (C), for example closed-looped with straight portions (R) Connected by curved portions (C) as shown in FIG. 1.

Figure 2:
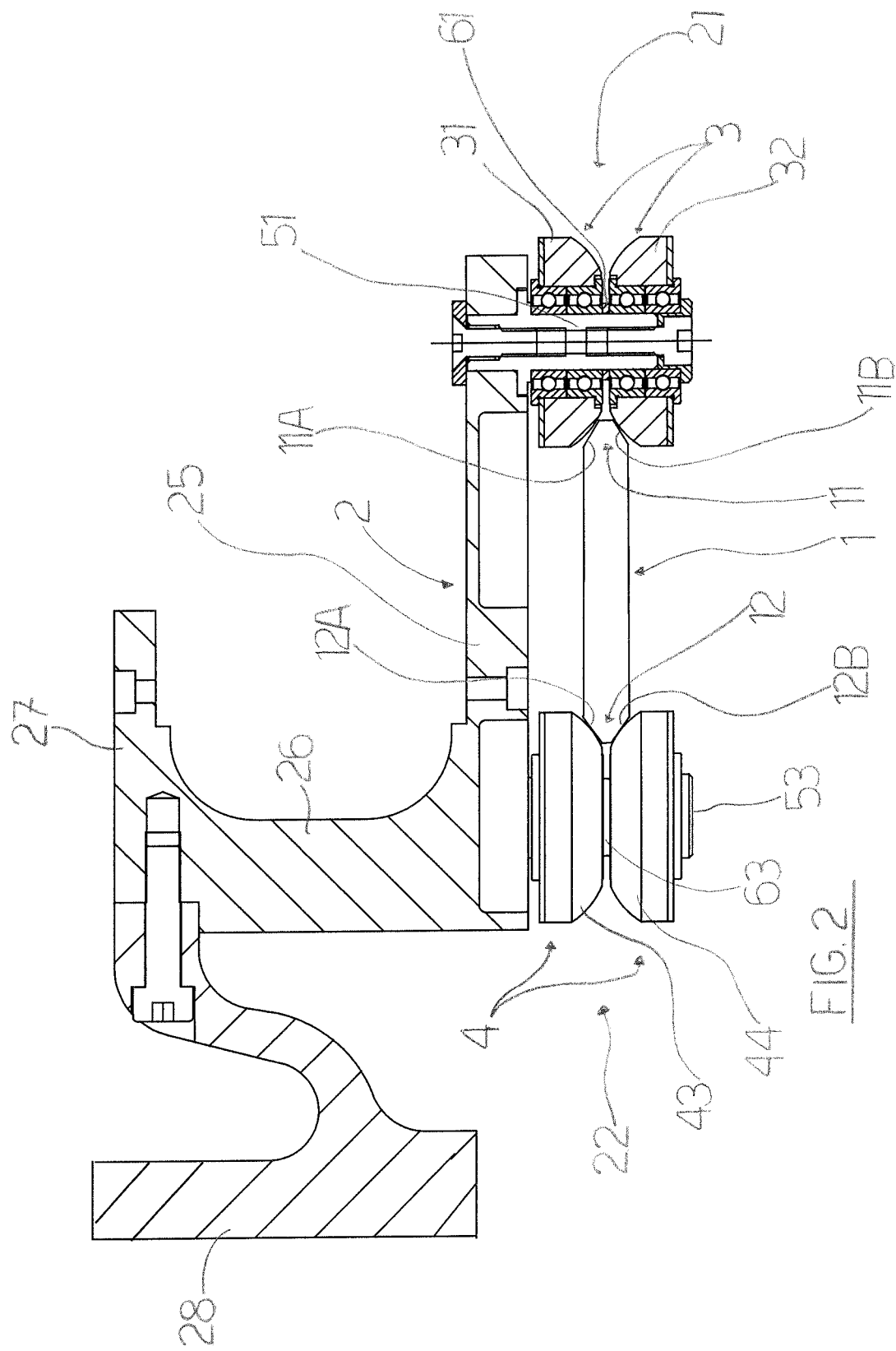
FIG. 2 is a schematic view according to section plant II-II of FIG. 1, in larger scale.

The first guide profile (11) is conformed in such a way as in turn to have a first rolling wall (11A) and a second rolling wall (11B) arranged inclined to one another, while the second guide profile (12) is conformed in such a way as in turn to have a first rolling wall (12A) and a second rolling wall (12B) arranged inclined to one another (see for example FIG. 2).

In order to be moved along the guide path (1), the mobile carriage (2) comprises a first group (21) of rolling members (3) and a second group (22) of rolling members (4), the mobile carriage (2) being coupled to the guide path (1) so that the first group (21) of rolling members (3) is in contact with the first guide profile (11) and the second group (22) of rolling members (4) is in contact with the second guide profile (12).

The peculiarities of the transport system (S) of the present invention consist in the fact that the first group (21) of rolling members (3) comprises a single pair of rollers (31, 32) which are mounted rotatably in an independent way to one another on a first rotation shaft (51) borne by the mobile carriage (2).

In particular, the rollers (31, 32) of the single pair of rollers (31, 32) are mounted on the first rotation shaft (51) so that a first roller (31) is in contact with the first rolling wall (11A) of the first guide profile (11) and so that a second roller (32) is in contact with the second rolling wall (11B) of the first guide profile (11) (see for example FIG. 2, in the right sectioned part).

In this way, when the mobile carriage (2) is moved along the guide path (1), the first roller (31) can roll along the first rolling wall (11A) of the first guide profile (11) in an independent way from the second roller (32) which rolls along the second rolling wall (11B) of the first guide profile (11).

In turn, the second group (22) of rolling members (4) comprises a first pair of rollers (41, 42) and a second pair of rollers (43, 44).

The rollers (41, 42) of the first pair of rollers are mounted rotatably in an independent way to one another on a second rotation shaft (52) borne by the mobile carriage (2) and the rollers (43, 44) of the second pair of rollers are in turn mounted rotatably in an independent way to one another on a third rotation shaft (53) borne by the mobile carriage (2).

Figure 3A:
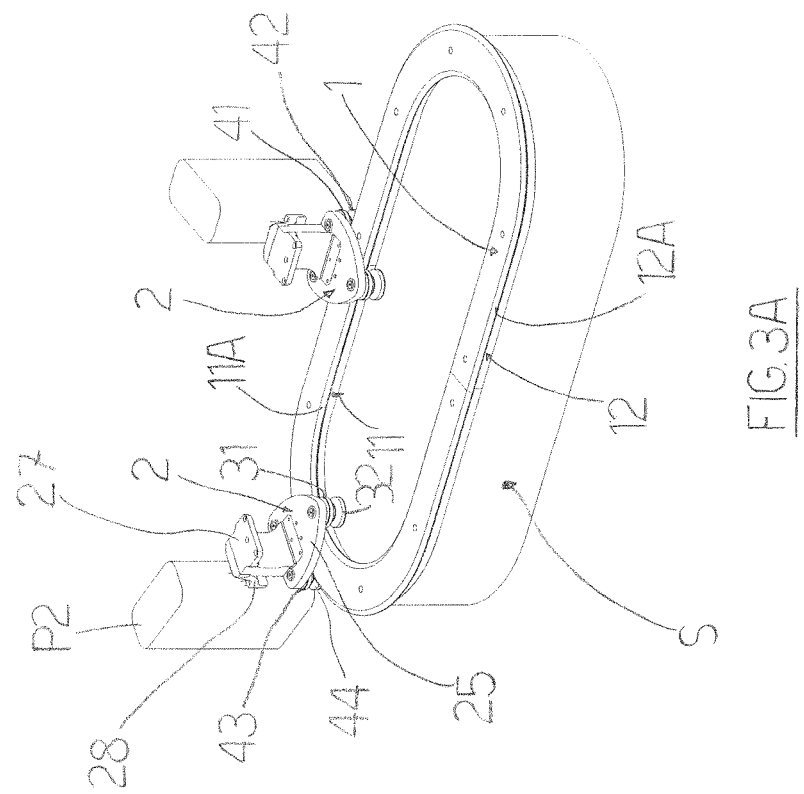
FIG. 3A is a schematic perspective view of the transport system of the invention arranged according to a possible preferred arrangement of the guide path.
Figure 3B:
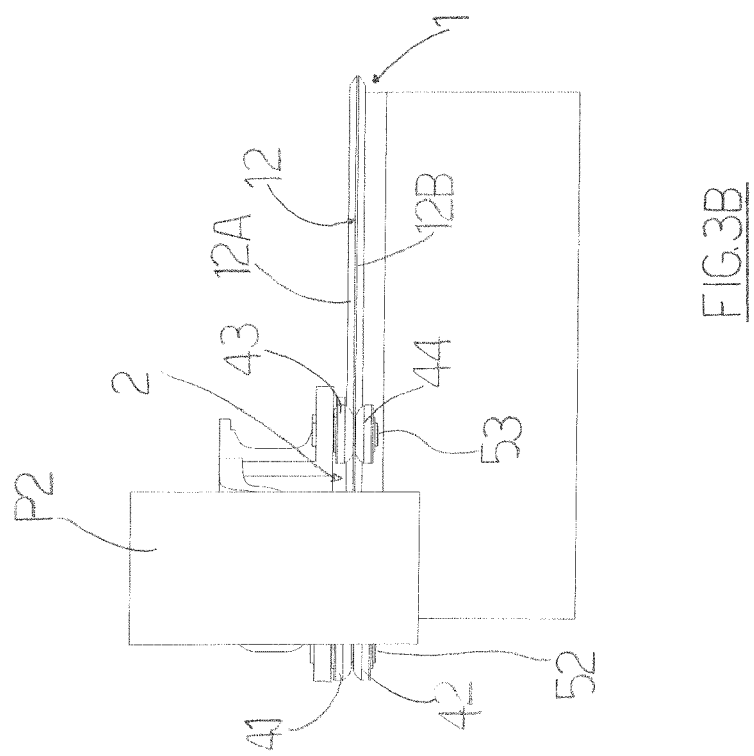
FIG. 3B is a lateral view of the transport system of FIG. 3A.
Figure 4A:
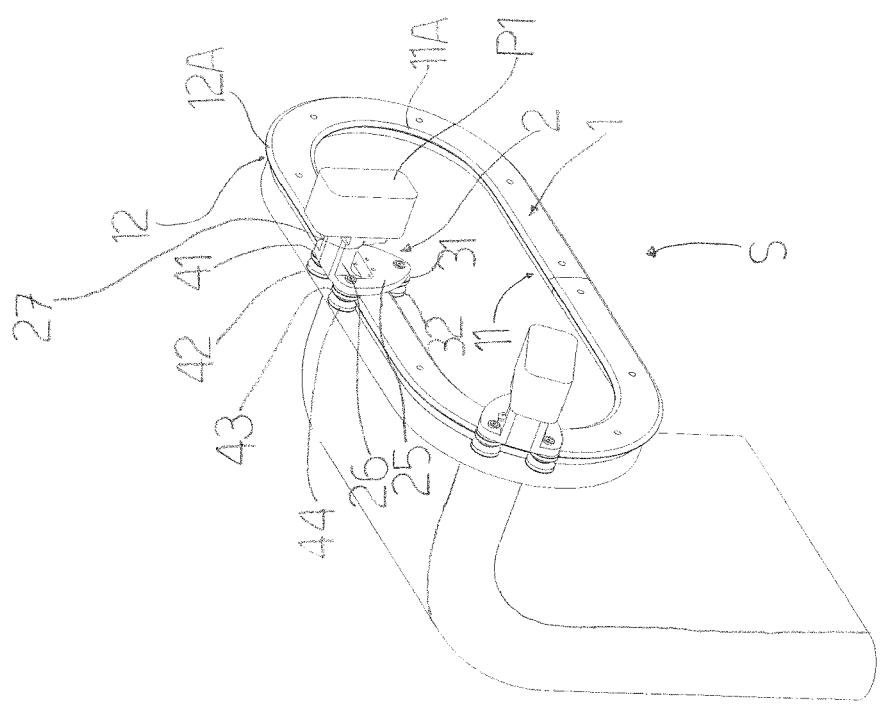
FIG. 4A is a schematic perspective view of the transport system of the invention arranged according to a further possible preferred arrangement of the guide path.
Figure 4B:
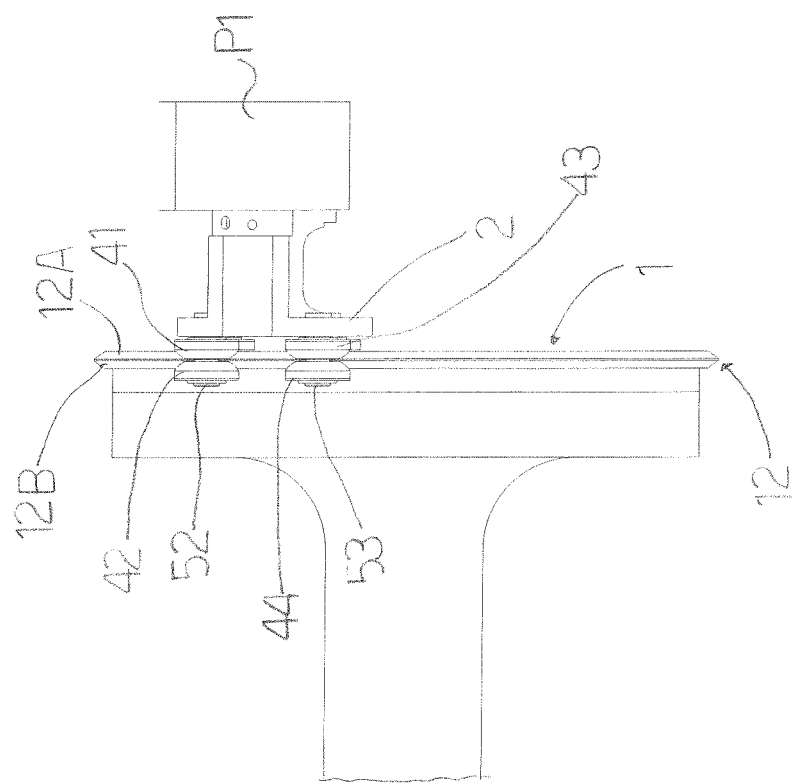
FIG. 4B is a lateral view of the transport system of FIG. 4A.

In particular, the rollers (41, 42) of the first pair of rollers are mounted on the second rotation shaft (52) so that a first roller (41) is in contact with the first rolling wall (12A) of the second guide profile (12) and a second roller (42) is in contact with the second rolling wall (12B) of the second guide profile (12) and the rollers (43, 44) of the second pair of rollers are mounted on the third rotation shaft (53) so that a first roller (43) is in contact with the first rolling wall (12A) of the second guide profile (12) and a second roller (44) is in contact with the second rolling wall (12B) of the second guide profile (12) (see for example FIGS. 3B, 4B).

In this case too, therefore, when the mobile carriage (2) is moved along the guide path (1), the first roller (41) of the first pair of rollers and the first roller (43) of the second pair of rollers can roll along the first rolling wall (12A) of the second guide profile (12) in an independent way, respectively, from the second roller (42) of the first pair of rollers and from the second roller (44) of the second pair of rollers which roll along the second rolling wall (12B) of the second guide profile (2).

Owing to these specifications, the rollers of the two groups of rolling members can roll along the two guide profiles of the guide path in an independent way from one another, and thus can autonomously react to the stresses that might act on them, with a consequent reduction of wear.

Further, as the first group of rolling members comprises a single pair of rollers which are in contact with the first guide profile, and the second group of rolling members comprises two pairs of rollers in contact with the second guide profile, the mobile carriage has only three points of contact with the guide path, one for the first guide profile two for the second guide profile (see for example FIG. 1, on the left side and partly sectioned).

This specification thus enables the mobile carriage to pass from a straight portion to a curved portion and vice versa of the guide path, while remaining always and in any case in contact therewith, thus reducing the friction stresses acting on the rolling members with respect to the transport systems of known type, and also guaranteeing excellent stability of position and orientation for the production being transported.

Consequently this specification too enables reducing the wear that can occur on the rollers of the two groups of rolling members and thus reduce the frequency with which it will be necessary to replace them.

A further particular aspect of the transport system of the invention relates to the special conformation and structure of the mobile carriage (2).

It comprises: a base plate (25) on which the first rotation shaft (51), the second rotation shaft (52) and the third rotation shaft (53) are mounted; an upright member (26) borne by the base plate (25), a first support member (27) predisposed transversally to the upright member (26) in such a way as to be facing the base plate (25) and which is conformed for hooking and supporting a relative product (P1) to be transported.

A second support member (28) can further be added to the mobile carriage (2), removably couplable to the upright member (26), on the opposite side with respect to the first support member (28), and which is conformed for hooking and supporting a relative product (P2) to be transported.

In this way, in a case in which the guide path (1) is conformed as a closed loop and is arranged on a horizontal plane, such as for example in the case illustrated in FIGS. 3A and 3B, the second support member (28) can be coupled to the upright member (26) and constitute the hooking and support point for a relative product (P2) to be transported.

Instead, in a case in which the guide path (1) is conformed as a closed loop and is arranged on a horizontal plane, such as for example in the case illustrated in FIGS. 4A and 4B, the second support member (28) can be demounted from the upright member (26) and the product (P1) to be transported can be hooked to and borne by the first support member (27).

Therefore, owing to its particular structure, and to the fact that the second support member (28) is removably couplable to the upright member (26), on the opposite side with respect to the first support member (28), and therefore is demountable from the upright member (26), the mobile carriage (2) can be advantageously usable equally in both the case in which the transport system (S) has the looped path arranged on a horizontal plane and in the case in which the transport system (S) has the closed looped path arranged on a vertical plane.

Other advantageous characteristics of the transport system of the invention are set down in the following.

The first rotation shaft (51), the second rotation shaft (52) and the third rotation shaft (53) are predisposed and mounted on the mobile carriage (2) so as to be parallel to one another.

In particular, the first rotation shaft (51), the second rotation shaft (52) and the third rotation shaft (53) are predisposed and mounted on the mobile carriage (2) so as to be arranged at vertices of a triangle.

The first rotation shaft (51), the second rotation shaft (52) and the third rotation shaft (53) are preferably predisposed and mounted on the mobile carriage (2) so as to be arranged at vertices of an isosceles or an equilateral or a right-angled triangle.

In the preferred embodiment illustrated in the figures, the first rotation shaft (51), the second rotation shaft (52) and the third rotation shaft (53) are arranged at vertices of a isosceles triangle, so that the points of contact between the single pair of rollers (31, 32) of the first group (21) of rolling members (3) with the first guide profile (11), and between the two pairs of rollers (41, 42; 43, 44) of the second group (22) of rolling members (4) with the second guide profile (12) are also arranged at the vertices of an isosceles triangle (see for example FIG. 1, in the partly-sectioned left side).

In particular, this configuration is particularly advantageous in terms of balancing and stability of the carriage, in the passage thereof from the straight portions to the curved portions of the guide path and vice versa.

More in particular, in this particular configuration, the point of contact of the single pair of rollers (31, 32) of the first group (21) of rolling members (3) with the first guide profile (11) is at the radii of curvature of the curved portions (C) of the closed loop guide path.

Other advantageous characteristics of the transport system (S) of the invention are as follows.

The transport system (S) comprises a first spacer member (61) which is mounted on the first rotation shaft (51) in such a way as to be interposed between the rollers (31, 32) of the single pair of rollers of the first group (21) of rolling members (3) so as to maintain the rollers (31, 32) of the single pair of rollers spaced in relation to the distance between the first rolling wall (11A) and the second rolling wall (11B) of the first guide profile (11) (see for example FIG. 2 and FIG. 5A).

The transport system (S) further comprises a second spacer member (62) which is mounted on the second rotation shaft (52) so as to be interposed between the rollers (41, 42) of the first pair of rollers of the second group (22) of rolling members (4) so as to maintain the rollers (41, 42) of the first pair of rollers distanced in relation to the distance between the first rolling wall (12A) and the second rolling wall (12B) of the second guide profile (12), and also a third spacer member (63) which is mounted on the third rotation shaft (53) so as to be interposed between the rollers (43, 44) of the second pair of rollers of the second group (22) of rolling members (4) so as to maintain the rollers (43, 44) of the second pair of rollers distanced in relation to the distance between the first rolling wall (12A) and the second rolling wall (12B) of the second guide profile (12) (see for example FIG. 5A).

The presence of the spacers interposed between the rollers of the pairs of rollers of the rolling members advantageously enables distancing the rollers from each other on the basis of the effective distance existing between the two rolling walls of the two guide profiles, and also enables regulating and varying the distance thereof according to the presence of any imperfections or irregularities of the two rolling walls.

In this regard, the rollers (31, 32) of the single pair of rollers of the first group (21) of rolling members (3) are mounted on the first rotation shaft (51) in such a way that at least one thereof is demountable from the first rotation shaft (51) so as to enable replacement of the first spacer member (61) with another spacer member having different dimensions.

In the same way, the rollers (41, 42) of the first pair of rollers of the second group (22) of rolling members (4) are mounted on the second rotation shaft (52) in such a way that at least one thereof is demountable from the second rotation shaft (52) so as to enable replacement of the second spacer member (62) with another spacer member having different dimensions; and the rollers (43, 44) of the second pair of rollers of the second group (22) of rolling members (4) are mounted on the third rotation shaft (53) in such a way that at least one thereof is demountable from the third rotation shaft (53) so as to enable replacement of the third spacer member (63) with another spacer member having different dimensions.

The rollers (31, 32) of the single pair of rollers of the first group (21) of rolling members (3) have a lateral contact surface with the first guide profile (11) having a truncoconical shape or a spherical cap shape; the rollers (41, 42) of the first pair of rollers of the second group (22) of rolling members (4) have a lateral contact surface with the second guide profile (12) having a truncoconical shape or a spherical cap shape; the rollers (43, 44) of the second pair of rollers of the second group (22) of rolling members (4) have a lateral contact surface with the second guide profile (12) having a truncoconical shape or a spherical cap shape.

The rollers (31, 32) of the single pair of rollers of the first group (21) of rolling members (3), the rollers (41, 42) of the first pair of rollers of the second group (22) of rolling members (4) and the rollers (43, 44) of the second pair of rollers of the second group (22) of rolling members (4) are made of a yielding plastic material.

This enables further reducing the degree of wear of the rollers in consequence of the friction stresses acting thereon during the movement of the carriage along the guide path.

From the foregoing it is clear how the transport system of the present invention effectively obviates the various issues encountered in transport systems of the prior art described in the foregoing.

The invention claimed is:

1. A transport system for transport of products, comprising:
    a guide path and at least one mobile carriage for transport of products movable along the guide path,
    the guide path being conformed in such a way as to comprise a first guide profile and a second guide profile, parallel to one another and having an extension that includes at least one straight portion and at least one curved portion,
    the first guide profile being conformed in such a way as to have a first rolling wall and a second rolling wall arranged inclined to one another,
    the second guide profile being conformed in such a way as in turn to have a first rolling wall and a second rolling wall arranged inclined to one another;
    a first rotation shaft borne by the at least one mobile carriage;
    a second rotation shaft borne by the at least one mobile carriage; and
    a third rotation shaft borne by at least one mobile carriage;
    wherein the at least one mobile carriage comprises a first group of rolling members and a second group of rolling members, the at least one mobile carriage being coupled to the guide path so that the first group of rolling members is in contact with the first guide profile and the second group of rolling members is in contact with the second guide profile,
    wherein the first group of rolling members comprises a single pair of rollers, the rollers of the single pair of rollers being both mounted rotatably and in an independent way to one another on the first rotation shaft, the rollers of the single pair of rollers being mounted on the first rotation shaft so that a first roller is in contact with the first rolling wall of the first guide profile and in that a second roller is in contact with the second rolling wall of the first guide profile so that when the at least one mobile carriage is moved along the guide path, the first roller can roll along the first rolling wall of the first guide profile independently of the second roller which rolls along the second rolling wall of the first guide profile;
    wherein the second group of rolling members comprises a first pair of rollers and a second pair of rollers, the rollers of the first pair of rollers both being mounted rotatably and in an independent way to one another on the second rotation shaft and the rollers of the second pair of rollers being both mounted rotatably and in an independent way to one another on the third rotation shaft, the rollers of the first pair of rollers being mounted on the second rotation shaft so that a first roller of the first pair of rollers is in contact with the first rolling wall of the second guide profile and a second roller of the first pair of rollers is in contact with the second rolling wall of the second guide profile and the rollers of the second pair of rollers being mounted on the third rotation shaft so that a first roller of the second pair of rollers is in contact with the first rolling wall of the second guide profile and a second roller of the second pair of rollers is in contact with the second rolling wall of the second guide profile, so that when the at least one mobile carriage is moved along the guide path, the first roller of the first pair of rollers and the first roller of the second pair of rollers can roll along the first rolling wall of the second guide profile in an independent way, respectively, from the second roller of the first pair of rollers and from the second roller of the second pair of rollers which roll along the second rolling wall of the second guide profile,
    wherein the at least one mobile carriage further comprises:
    a base plate on which the first rotation shaft, the second rotation shaft and the third rotation shaft are mounted; and
    an upright member borne by the base plate, a first support member borne by the upright member and a second support member borne by the upright member, the first support member being arranged transversally to the upright member in such a way as to be facing the base plate, the second support member being removably coupled to the upright member on the opposite side of the upright member with respect to the first support member, wherein the first support member is conformed for hooking and supporting a respective product to be transported and the second support member is conformed for hooking and supporting a respective product to be transported.

2. The transport system of claim 1, wherein the first rotation shaft, the second rotation shaft and the third rotation shaft are predisposed and mounted on the at least one mobile carriage so as to be parallel to one another.

3. The transport system of claim 1, wherein:
    the rollers of the single pair of rollers of the first group of rolling members have a lateral contact surface with the first guide profile having a truncoconical shape or a spherical cap shape;
    the rollers of the first pair of rollers of the second group of rolling members have a lateral contact surface with the second guide profile having a truncoconical shape or a spherical cap shape; and
    the rollers of the second pair of rollers of the second group of rolling members have a lateral contact surface with the second guide profile having a truncoconical shape or a spherical cap shape.

4. The transport system of claim 1, wherein:
the rollers of the single pair of rollers of the first group of rolling members; and
the rollers of the first pair of rollers of the second group of rolling members and the rollers of the second pair of rollers of the second group of rolling members are made of a yielding plastic material.

5. A transport system for transport of products, comprising:
a guide path and at least one mobile carriage for transport of products movable along the guide path, the guide path being conformed in such a way as to comprise a first guide profile and a second guide profile parallel to one another and having an extension including at least one straight portion and at least one curved portion, the first guide profile being conformed in such a way as to have a first rolling wall and a second rolling wall arranged inclined to one another, the second guide profile being conformed in such a way as in turn to have a first rolling wall and a second rolling wall arranged inclined to one another;
wherein the at least one mobile carriage comprises a first group of rolling members and a second group of rolling members, the at least one mobile carriage being coupled to the guide path so that the first group of rolling members is in contact with the first guide profile and the second group of rolling members is in contact with the second guide profile,
wherein the first group of rolling members comprises a single pair of rollers mounted rotatably in an independent way to one another on a first rotation shaft borne by the at least one mobile carriage, the rollers of the single pair of rollers being mounted on the first rotation shaft so that a first roller is in contact with the first rolling wall of the first guide profile and in that a second roller is in contact with the second rolling wall of the first guide profile so that when the at least one mobile carriage is moved along the guide path, the first roller can roll along the first rolling wall of the first guide profile independently of the second roller which rolls along the second rolling wall of the first guide profile;
wherein the second group of rolling members comprises a first pair of rollers and a second pair of rollers, the rollers of the first pair of rollers being mounted rotatably in an independent way to one another on a second rotation shaft borne by the at least one mobile carriage and the rollers of the second pair of rollers being in turn mounted rotatably in an independent way to one another on a third rotation shaft borne by the at least one mobile carriage, the rollers of the first pair of rollers being mounted on the second rotation shaft so that a first roller of the first pair of rollers is in contact with the first rolling wall of the second guide profile and a second roller of the first pair of rollers is in contact with the second rolling wall of the second guide profile and the rollers of the second pair of rollers being mounted on the third rotation shaft so that a first roller of the second pair of rollers is in contact with the first rolling wall of the second guide profile and a second roller of the second pair of rollers is in contact with the second rolling wall of the second guide profile, so that when the at least one mobile carriage is moved along the guide path, the first roller of the first pair of rollers and the first roller of the second pair of rollers can roll along the first rolling wall of the second guide profile in an independent way, respectively, from the second roller of the first pair of rollers and from the second roller of the second pair of rollers which roll along the second rolling wall of the second guide profile,
wherein the at least one mobile carriage comprises:
a base plate on which the first rotation shaft, the second rotation shaft and the third rotation shaft are mounted; and
an upright member borne by the base plate, a first support member predisposed transversally to the upright member in such a way as to be facing the base plate and which is conformed for hooking and supporting a respective product to be transported, and a second support member removably couplable to the upright member, on the opposite side with respect to the first support member and which is conformed for hooking and supporting a respective product to be transported,
wherein the first rotation shaft, the second rotation shaft and the third rotation shaft are predisposed and mounted on the at least one mobile carriage so as to be parallel to one another,
wherein the first rotation shaft, the second rotation shaft and the third rotation shaft are predisposed and mounted on the at least one mobile carriage so as to be arranged at vertices of a triangle.

6. The transport system of claim 5, wherein the first rotation shaft, the second rotation shaft and the third rotation shaft are predisposed and mounted on the at least one mobile carriage so as to be arranged at vertices of an isosceles or an equilateral or a rectangle triangle.

7. A transport system for transport of products, comprising:
a guide path and at least one mobile carriage for transport of products movable along the guide path, the guide path being conformed in such a way as to comprise a first guide profile and a second guide profile parallel to one another and having an extension including at least one straight portion and at least one curved portion, the first guide profile being conformed in such a way as to have a first rolling wall and a second rolling wall arranged inclined to one another, the second guide profile being conformed in such a way as in turn to have a first rolling wall and a second rolling wall arranged inclined to one another;
wherein the at least one mobile carriage comprises a first group of rolling members and a second group of rolling members, the at least one mobile carriage being coupled to the guide path so that the first group of rolling members is in contact with the first guide profile and the second group of rolling members is in contact with the second guide profile,
wherein the first group of rolling members comprises a single pair of rollers mounted rotatably in an independent way to one another on a first rotation shaft borne by the at least one mobile carriage, the rollers of the single pair of rollers being mounted on the first rotation shaft so that a first roller is in contact with the first rolling wall of the first guide profile and in that a second roller is in contact with the second rolling wall of the first guide profile so that when the at least one mobile carriage is moved along the guide path, the first roller can roll along the first rolling wall of the first guide profile independently of the second roller which rolls along the second rolling wall of the first guide profile;
wherein the second group of rolling members comprises a first pair of rollers and a second pair of rollers, the rollers of the first pair of rollers being mounted rotatably in an independent way to one another on a second rotation shaft borne by the at least one mobile carriage and the rollers of the second pair of rollers being in turn mounted rotatably in an independent way to one another on a third rotation shaft borne by the at least one mobile carriage, the rollers of the first pair of rollers being mounted on the second rotation shaft so that a first roller of the first pair of rollers is in contact with the first rolling wall of the second guide profile and a second roller of the first pair of rollers is in contact with the second rolling wall of the second guide profile and the rollers of the second pair of rollers being mounted on the third rotation shaft so that a first roller of the second pair of rollers is in contact with the first rolling wall of the second guide profile and a second roller of the second pair of rollers is in contact with the second rolling wall of the second guide profile, so that when the at least one mobile carriage is moved along the guide path, the first roller of the first pair of rollers and the first roller of the second pair of rollers can roll along the first rolling wall of the second guide profile in an independent way, respectively, from the second roller of the first pair of rollers and from the second roller of the second pair of rollers which roll along the second rolling wall of the second guide profile, wherein the at least one mobile carriage comprises:

a base plate on which the first rotation shaft, the second rotation shaft and the third rotation shaft are mounted; and an upright member borne by the base plate, a first support member predisposed transversally to the upright member in such a way as to be facing the base plate and which is conformed for hooking and supporting a respective product to be transported, and a second support member removably couplable to the upright member, on the opposite side with respect to the first support member and which is conformed for hooking and supporting a respective product to be transported, wherein the first rotation shaft, the second rotation shaft and the third rotation shaft are predisposed and mounted on the at least one mobile carriage so as to be parallel to one another, wherein:

a first spacer member is mounted on the first rotation shaft in such a way as to be interposed between the rollers of the single pair of rollers of the first group of rolling members so as to maintain the rollers of the single pair of rollers distanced in relation to the distance between the first rolling wall and the second rolling wall of the first guide profile;

a second spacer member is mounted on the second rotation shaft so as to be interposed between the rollers of the first pair of rollers of the second group of rolling members so as to maintain the rollers of the first pair of rollers distanced in relation to the distance between the first rolling wall and the second rolling wall of the second guide profile; and a third spacer member is mounted on the third rotation shaft so as to be interposed between the rollers of the second pair of rollers of the second group of rolling members so as to maintain the rollers of the second pair of rollers distanced in relation to the distance between the first rolling wall and the second rolling wall of the second guide profile.

8. The transport system of claim 7, wherein:

the rollers of the single pair of rollers of the first group of rolling members are mounted on the first rotation shaft in such a way that at least one thereof is demountable from the first rotation shaft so as to enable replacement of the first spacer member with another spacer member having different dimensions;

of the first pair of rollers of the second group of rolling members are mounted on the second rotation shaft in such a way that at least one thereof is demountable from the second rotation shaft so as to enable replacement of the second spacer member with another spacer member having different dimensions; and the rollers of the second pair of rollers of the second group of rolling members are mounted on the third rotation shaft in such a way that at least one thereof is demountable from the third rotation shaft so as to enable replacement of the third spacer member with another spacer member having different dimensions.

* * * * *